United States Patent Office 3,767,827
Patented Oct. 23, 1973

3,767,827
PRESERVATION OF ALCOHOLIC BEVERAGES WITH DI-SUBSTITUTED BENZOIC ESTERS AND KETONES
Ryuzo Ueno and Motomu Kashihara, Nishinomiya, and Toshio Matsuda, Itami, Japan, assignors to Ueno Fine Chemical Industries, Ltd., Osaka, Japan
No Drawing. Filed Aug. 17, 1970, Ser. No. 64,589
Claims priority, application Japan, Dec. 6, 1969, 44/97,538, 44/97,539, 44/97,540; Dec. 19, 1969, 44/101,672; Dec. 22, 1969, 44/102,677
Int. Cl. C12b 1/00
U.S. Cl. 426—330          5 Claims

ABSTRACT OF THE DISCLOSURE

A process for the preservation of liquid foodstuffs which comprises adding to a liquid foodstuff a compound expressed by the formula

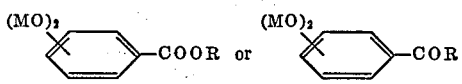

wherein R is an alkyl group of 3–8 carbon atoms and M stands for hydrogen, and alkali metal or ½ mole of an alkaline earth metal, in an amount of 5–300 p.p.m.

---

This invention relates to a process for the preservation of liquid foodstuffs. More specifically, the invention relates to a process for the preservation of liquid foodstuffs which comprises adding to a liquid foodstuff a dihydroxybenzoic acid ester or dihydroxyphenyl alkyl ketone, and to a liquid foodstuff composition stabilized against deterioration and putrefaction during storage.

The "liquid foodstuff" used in the present specification and claims is meant to include liquid condiments such as soy, vinegar and sauce, and beverages such as natural fruit juice, carbonated drink, beer, fruit wine and sake.

As preservatives generally used for such liquid foodstuffs there have been known benzoic acid, salicyclic acid, dehydroacetic acid salts, para-hydroxybenzoic acid esters and sorbic acid salts.

In these preservatives, it sometimes happens that a sufficient preservative effect cannot be expected when they are added in amounts within the range allowed by the Food Sanitation Law. Further, their effects vary depending on the kinds of foodstuffs to which they are added.

For instance, in the case of beer, heptyl para-hydroxybenzoate is used in an amount of 10–12 p.p.m. and it is effective against main saprogenous microorganisms such as yeasts and lactobacilli. But because of its limited solubility in beer heptyl para-hydroxybenzoate is caused to precipitate at a temperature approximating 0° C. and the beer becomes turbid. In the case of soy, propyl and butyl esters of para-hydroxybenzoic acid are used for controlling main saprogenous microorganism such as wild yeast, but in the case of soy which has not been heated at 80° C. for 20–30 minutes, these esters are decomposed by esterase remaining in the soy, and their effects are lost. In the case of sake, it is allowed in Japan to use salicyclic acid in an amount of up to 250 p.p.m. for controlling the main saprogenous bacteria such as *Lactobacillus homohiochi* and hiochic lactobacilli, but the addition of salicylic acid in such amount does not result in a sufficient preservative effect. Further, in the case of salicylic acid there is a problem of toxicity. Against main saprogenous bacteria of vinegar such as *Acetobacter xylinum* and other acetic acid bacteria, butyl para-hydroxybenzoate is mainly used as preservative. However, at a concentration effective for controlling such saprogenous bacteria, e.g., about 140 p.p.m. butyl para-hydroxybenzoate has a tendency of precipitating during storage at about 0° C. because of its limited solubility in vinegar, and vinegar becomes opaque and turbid. In case benzoic acid or sorbic acid is used for controlling main saprogenous microorganisms of fruit juices such as yeast and mold, these acids gives bad influences to flavors of juices. When butyl para-hydroxybenzoate and sorbic acid are used as preservative for sake or fruit wine, they give extremely bad influences to such drinks at their effective concentrations (70–100 p.p.m. in the former and 200–400 p.p.m. in the latter), with the result that their values as drinks are lost.

It has now been found that aromatic carboxylic acid esters or aromatic ketones having two hydroxyl groups linked to the benzene nucleus, which will be detailed below, have excellent antibacterial spectra and are generally characterized by very low toxicity because precursors of these compounds are existent broadly in the natural world and are usually harmless to the human body, and that these compounds have excellent solubility in liquid foodstuffs and are excellent in storage stabiilty.

In accordance with this invention there is provided a process for the preservation of liquid foodstuffs which comprises adding to a liquid foodstuff a compound expressed by the formula

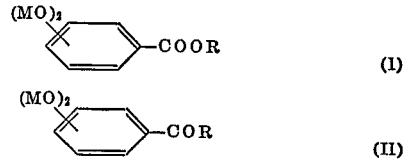

wherein R is an alkyl group of 3–8 carbon atoms and M stands for hydrogen, an alkali metal or ½ mole of an alkaline earth metal.

In the General Formulae I and II, the alkyl group represented by R may be either straight or branched, but generally it is preferable that R is a straight alkyl group.

Compounds of the Formulae I and II usable in this invention are listed in Table 1.

TABLE 1

| Compound No. | Structural formula | Solubility (γ/ml.) | | Melting point (° C.) [Boiling point (° C.)] |
| --- | --- | --- | --- | --- |
| | | Water | 15% aqueous solution of ethanol | |
| 1 | HO—⟨○⟩—COOC₃H₇ with OH | 2.50×10³ | 7.02×10² | 39 |
| | | | | |
| 2 | HO—⟨○⟩—COOC₄H₉ with OH | 1.08×10² | 5.13×10² | 60–61 |

TABLE 1—Continued

| Compound No. | Structural formula | Solubility (γ/ml.) Water | 15% aqueous solution of ethanol | Melting point (° C.) [Boiling point (° C.)] |
|---|---|---|---|---|
| 3 | HO—⌬(OH)—COOC$_5$H$_{11}$ | $3.88 \times 10$ | $8.62 \times 10$ | [145/0.08 mm. Hg] |
| 4 | HO—⌬(OH)—COOC$_6$H$_{13}$ | $1.37 \times 10$ | $4.21 \times 10$ | [147./0.1 mm. Hg] |
| 5 | HO—⌬(OH)—COOC$_7$H$_{15}$ | $5.82 \times 10$ | $2.50 \times 10$ | [156/0.1 mm. Hg] |
| 6 | HO—⌬(OH)—COOC$_8$H$_{17}$ | $3.28$ | $1.61 \times 10$ | [160/0.2 mm. Hg] |
| 7 | ⌬(OH)(HO)—COOC$_3$H$_7$ | $1.57 \times 10^3$ | $5.21 \times 10^3$ | 60 |
| 8 | ⌬(OH)(HO)—COOC$_4$H$_9$ | $7.53 \times 10^3$ | $1.35 \times 10^3$ | 62–4 |
| 9 | ⌬(OH)(HO)—COOC$_5$H$_{11}$ | $3.10 \times 10^2$ | $6.19 \times 10^2$ | [145/1 mm. Hg] |
| 10 | ⌬(OH)(HO)—COOC$_6$H$_{13}$ | $1.91 \times 10^2$ | $5.72 \times 10^2$ | [170/2 mm. Hg] |
| 11 | ⌬(OH)(HO)—COOC$_7$H$_{15}$ | $5.64 \times 10$ | $1.13 \times 10^2$ | [168/1 mm. Hg] |
| 12 | ⌬(OH)(HO)—COOC$_8$H$_{17}$ | $2.46 \times 10$ | $2.00 \times 10$ | [178/1 mm. Hg] |
| 13 | HO—⌬(HO)—COOC$_3$H$_7$ | $1.29 \times 10^3$ | $4.37 \times 10^3$ | 115 |
| 14 | HO—⌬(HO)—COOC$_4$H$_9$ | $5.45 \times 10^2$ | $4.37 \times 10^3$ | 113–5 |
| 15 | HO—⌬(HO)—COOC$_5$H$_{11}$ | $2.92 \times 10^2$ | $7.80 \times 10^2$ | 93.5–94.5 |
| 16 | HO—⌬(HO)—COOC$_6$H$_{13}$ | $1.81 \times 10^2$ | $5.43 \times 10^2$ | 117 |
| 17 | HO—⌬(HO)—COOC$_7$H$_{15}$ | $7.20 \times 10$ | $1.45 \times 10^2$ | 84–86 |

TABLE 1—Continued

| Compound No. | Structural formula | Solubility (γ/ml.) Water | 15% aqueous solution of ethanol | Melting point (° C.) [Boiling point (° C.)] |
|---|---|---|---|---|
| 18 | HO-, HO- benzene -COOC$_8$H$_{17}$ | 1.91×10 | 2.75×10 | 101–103 |
| 19 | HO-, HO- benzene -COOC$_3$H$_7$ | 1.86×10$^3$ | 7.29×10$^3$ | 60–61 |
| 20 | HO-, HO- benzene -COOC$_4$H$_9$ | 6.48×10$^2$ | 1.35×10$^3$ | [198/0.2 mm. Hg] |
| 21 | HO-, HO- benzene -COOC$_5$H$_{11}$ | 2.14×10$^2$ | 6.48×10$^2$ | [205–210/0.15 mm. Hg] |
| 22 | HO-, HO- benzene -COOC$_6$H$_{13}$ | 8.22×10 | 4.87×10$^2$ | [208–212/0.1 mm. Hg] |
| 23 | HO-, HO- benzene -COOC$_7$H$_{15}$ | 3.92×10 | 1.20×20$^2$ | [215/0.1 mm. Hg] |
| 24 | HO-, HO- benzene -COOC$_8$H$_{17}$ | 2.12×10 | 6.88×10 | [220/0.1 mm. Hg] |
| 25 | OH, HO- benzene -COC$_3$H$_7$ | 1.53×10$^3$ | 3.20×10$^3$ | 52–4 |
| 26 | OH, HO- benzene -COC$_4$H$_9$ | 3.94×10$^2$ | 6.93×10$^2$ | 57–60 |
| 27 | HO, HO- benzene -COC$_5$H$_{13}$ | 5.68×10 | 2.18×10$^2$ | 53–5 |
| 28 | HO, HO- benzene -COC$_6$H$_{13}$ | 2.50×10 | 1.48×10$^2$ | 44–47 |
| 29 | HO, HO- benzene -COC$_7$H$_{15}$ | 9.13 | 7.45×10 | 62–63 |
| 30 | OH, HO- benzene -COC$_3$H$_7$ | 2.61×10$^2$ | 5.31×10$^2$ | 79–82 |
| 31 | OH, HO- benzene -COC$_4$H$_9$ | 7.44×10 | 2.93×10$^2$ | 51–4 |
| 32 | OH, HO- benzene -COC$_5$H$_{11}$ | 3.74×10 | 7.96×10 | 77–9 |

TABLE 1—Continued

| Compound No. | Structural formula | Solubility (γ/ml.) Water | 15% aqueous solution of ethanol | Melting point (° C.) [Boiling point (° C.)] |
|---|---|---|---|---|
| 33 | OH–C₆H₃(OH)–COC₆H₁₃ | $1.89 \times 10$ | $7.21 \times 10$ | 88–90 |
| 34 | OH–C₆H₃(OH)–COC₇H₁₅ | $1.32 \times 10$ | $6.19 \times 10$ | 85–87 |
| 35 | HO–C₆H₃(OH)–COC₃H₇ | $7.70 \times 10^2$ | $1.09 \times 10^3$ | 144–6 |
| 36 | HO–C₆H₃(OH)–COC₄H₉ | $3.71 \times 10^2$ | $9.46 \times 10^2$ | 94–6 |
| 37 | HO–C₆H₃(OH)–COC₅H₁₁ | $1.80 \times 10^2$ | $5.58 \times 10^2$ | 77–81 |
| 38 | HO–C₆H₃(OH)–COC₆H₁₃ | $3.66 \times 10$ | $1.49 \times 10^2$ | 83–85 |
| 39 | HO–C₆H₃(OH)–COC₇H₁₅ | $3.30 \times 10$ | $6.00 \times 10$ | 81–86 |

In this invention it is critical that the compound expressed by the Formula I or II should possess an alkyl group R having 3–8 carbon atoms. Among compounds expressed by the Formulae I and II, those having an alkyl group of up to 2 carbon atoms as R are not suitable because their antibacterial activity is very weak but their toxicity is high. On the other hand, those having as R an alkyl group of 9 or more carbon atoms are not preferred because of their low solubility.

The dihydroxybenzoic acid ester or dihydroxyphenyl alkyl ketone of this invention may be used in the form of a salt where the hydrogen atom of one or two hydroxyl groups is substituted by an alkali metal such as sodium and potassium or an alkaline earth metal such as magnesium and calcium, and in case the ester or ketone of this invention is used in the form of such salt, its solubility in water is further improved.

Any of compounds of the Formulae I and II to be used in this invention can be readily dissolved in liquid foodstuffs. Further, the compounds of this invention have a structure quite analogous to the structure of a para-hydroxybenzoic acid ester, the use of which is evaluated to be safe and harmless by World Health Organization (WHO) and Food and Agriculture Organization (FAO), and the internal metabolism course of the compounds of this invention is presumed to be similar to that of the para-hydroxybenzoic acid ester. Still further, analogous compounds to the compounds of this invention, such as gallic acid, protocatechuic acid and phloroglucine carbonic acid, are distributed broadly in the natural world and their safety is very high.

The compounds of this invention may be applied to the preservation of liquid foodstuffs of a broad range such as liquid condiments, e.g., soy, vinegar and sauce, and beverages, e.g., natural fruit juice, carbonated drink, beer, fruit wine and sake, but they are particularly effective when they are used for the preservation of fermentation products such as vinegar, soy and alcoholic beverages.

When the above compounds are applied to foodstuffs containing proteins in great quantities, they are easily bound to proteins and tend to lose their preservative activity. Accordingly, it is not preferred to use the compounds of this invention for the preservation of foodstuffs containing proteins in great quantities.

The compounds to be used in this invention exhibit a high solubility in liquid foodstuffs and even when they are added at a relatively high concentration, e.g., 300 p.p.m., they do not precipitate during storage. Since the above compounds, in general, have high antibacterial activity, sufficient effects can be attained when they are added to liquid foodstuffs in an amount of 5–60 p.p.m.

In the practice of this invention, the compounds of the Formula I or II may be added in any stage during the preparation of liquid foodstuffs. They may be added in the form of an aqueous solution of a caustic alkali such as sodium hydroxide and potassium hydroxide. They may be also applied after one or two of their hydroxyl groups have been converted to alkali metal salts. Still further, they may be used in the form of a phosphoric acid ester or glycerin ether, or in the form of a solution in ethanol, propylene glycol or other esculently harmless solvent such as glycerin and water. For instance, they may be used in the form of a solution in a mixed solvent of propylene glycol and sodium hydroxide.

The antibacterial activity of some of compounds of the Formulae I and II to be used in this invention is shown in Tables 2 and 3. The numerical values given in tables are values of the minimum growth inhibition concentration obtained in the antibacterial tests conducted at 30° C. for 4 days in a potato dextrose medium or an agar medium by employing various bacteria, yeast and fungi.

TABLE 2

| Bacterium | Compound (γ/ml.) | | | | | | | | | | | |
|---|---|---|---|---|---|---|---|---|---|---|---|---|
| | 1 | 2 | 3 | 7 | 8 | 9 | 13 | 14 | 15 | 19 | 20 | 21 |
| Staphylococcus aureus 209P | 100 | 100 | 25 | 400 | 400 | 100 | 400 | 400 | 200 | 800 | 800 | 800 |
| Bacillus subtilis PCI219 | 100 | 100 | 25 | 400 | 400 | 50 | 400 | 400 | 100 | 400 | 400 | 400 |
| Salmonella enteritidis 1891 | 400 | 200 | >100 | 400 | 400 | 100 | 200 | 200 | 200 | 400 | 400 | 400 |
| Escherichia coli O-55 | 400 | 400 | >100 | 400 | 400 | >200 | 400 | 400 | 400 | 800 | 800 | 800 |
| Proteus vulgaris HX19 | 50 | 50 | >100 | 400 | 400 | 50 | 400 | 200 | 100 | 200 | 200 | 200 |
| Aspergillus niger IAM3001 | 125 | 125 | >250 | 250 | 250 | 125 | 500 | 500 | 250 | 1,000 | 1,000 | 1,000 |
| Rhizopus nigricans IAM6070 | | | | 125 | 125 | | 250 | 250 | | | | |
| Saccharomyces cerevisiae | 62.5 | 62.5 | 62.5 | 125 | 125 | 62.5 | 250 | 250 | 125 | 500 | 500 | 500 |
| Hansenula anomala | 62.5 | 62.5 | >250 | 125 | 125 | ≥62.5 | 250 | 250 | 125 | 1,000 | 1,000 | 1,000 |
| Candida utilis | 62.5 | 62.5 | 125 | 250 | 250 | 62.5 | 250 | 250 | 125 | 500 | 500 | 500 |

TABLE 3

| Bacterium | Compound (γ/ml.) | | | | | | | | |
|---|---|---|---|---|---|---|---|---|---|
| | 25 | 26 | 27 | 30 | 31 | 32 | 35 | 36 | 37 |
| Staphylococcus aureus 209p | 400 | 200 | 100 | 800 | 100 | 100 | 800 | 800 | 400 |
| Bacillus subtilis PCI219 | 400 | 200 | 50 | 400 | 100 | 100 | 800 | 800 | 800 |
| Salmonella enteritidis 1891 | 400 | 100 | 200 | 400 | >200 | 200 | 800 | 400 | 200 |
| Escherichia coli O-55 | 400 | 400 | >200 | 800 | >200 | 200 | 800 | 800 | 400 |
| Proteus vulgaris HX19 | 200 | 100 | 25 | 400 | 100 | 100 | 800 | 400 | 200 |
| Aspergillus niger IAM3001 | 250 | 125 | 125 | >250 | 625 | >31.25 | >500 | >500 | 250 |
| Saccharomyces cerevisiae | 250 | 125 | >7.85 | >250 | 31.25 | >31.25 | >500 | 500 | 250 |
| Hansenula anomala | 250 | 125 | 31.25 | >250 | 31.25 | >31.25 | >500 | >500 | 250 |
| Candida albicans | ≥250 | 125 | 31.25 | >250 | 31.25 | >31.25 | >500 | 500 | 250 |

In Tables 2 and 3, the compound number corresponds to that of Table 1, which is the same in tables given hereinbelow.

In general, most of liquid foodstuffs have a pH of 2.0–5.0 and they contain suitable amounts of organic acids, amino acids or saccharides. Accordingly, they tend to form a culture medium for bacteria such as lactic acid bacteria, molds and film-forming yeasts. When the above-mentioned compounds of the Formula I and II are added to such liquid foodstuffs in the above-mentioned concentrations, they exhibit far more excellent preservative effects as compared with conventional preservatives. Further, these compounds are not decomposed in liquid foodstuff products but heighten their durability. Accordingly, liquid foodstuffs incorporated with the compounds of this invention can be used and eaten without anxiety of toxicity, their innoxiousness and safety being superior to conventional food preservatives.

The preservative effects and antibacterial activities of the compounds of this invention vary depending on the kind of main saprogenous microorganisms of the liquid foodstuff, and the position of the hydroxyl group and the number of the carbon atoms of the alkyl group are closely concerned with the kind of the liquid foodstuff to which the compounds may be applicable effectively. Accordingly, a suitable compound is selected depending on the kind of the liquid foodstuff to be preserved.

For instance, in the case of soy, vinegar and fruit juice, the number of the carbon atoms of the alkyl group is more significant than the position of the hydroxyl group, and it is desired to use a compound having 3–5 carbon atoms in the alkyl moiety.

Butyl para-hydroxybenzoate has been heretofore used frequently as preservative for soy. This compound, however, is relatively poor in the antibacterial activity, and it is necessary to use this compound in a concentration of 50–100 γ/ml. Thus it sometimes happens that the insoluble portion is caused to precipitate to form black dregs stuck to the wall of a soy bottle. In winter, the solubility of the compound is often lowered below its effective concentration. Further, since this preservative is decomposed by esterase present in soy when it is added to soy which has not been heated sufficiently or raw soy, it is impossible to conduct the pasteurizing treatment in a manner suitable for improving flavors of soy. On the other hand, the dihydroxybenzoic acid alkyl ester to be used in this invention is found by experiments to exhibit a sufficient preservative effect to soy at a low concentration such as 15–20γ/ml. and to overcome the above defect of the conventional preservative. It is also found that the addition of the dihydroxybenzoic acid alkyl ester of this invention at a concentration of 10–20γ/ml. can exhibit a sufficient preservative effect on sauce and stock liquor (soy dilution or amino acid-containing liquor) as in the case of soy.

Deterioration and putrefaction of vinegar are caused by acetic acid bacteria such as Acetobacter xylinum and Acetobacter aceti, resulting in formation of film, appearance of turbidness and lowering of acidity. Use of salicylic acid and para-hydroxybenzoic acid esters are preservative for vinegar is allowed, but salicylic acid is not effective at an allowed concentration and para-hydroxybenzoic acid esters are often precipitated at their effective concentration (140γ/ml.) in winter to cause white turbidness in vinegar. The compounds to be used in this invention can prevent deterioration and putrefaction of vinegar at a concentration of 20–30γ/ml. and can overcome the above-mentioned defects of conventional preservatives for vinegar.

Refreshing drinks are divided into the carbonated and non-carbonated types. In each type of refreshing drinks, deterioration is caused to occur by yeasts. It is allowed to use benzoic acid (600γ/ml.), dehydroacetic acid (50γ/ml.) and a para-hydroxybenzoic acid ester (100γ/ml.) as preservatives for refreshing drinks of both types, but even when they are added at allowed concentrations, formation of turbidness by yeasts is frequently observed. The compounds to be used in this invention can prevent occurrence of such deterioration at a concentration of 20–30γ/ml.

Natural fruit juices are easily contaminated with microorganisms during the course from the juice-squeezing step to the canning or bottling step, and deteriorations such as occurrence of turbidness and gas formation are caused by molds, yeasts and acid-resistant lactic acid bacteria. Such deteriorations may be prevented by adding to juice benzoic acid at a concentration of 500γ/ml. to some extent, but this preservative gives a peculiar unpleasant taste to the juice, and therefore, good results are hardly obtainable by use of this preservative. Dehydroacetic acid as preservative for juice is defective in that since it is gradually decomposed in a juice product and loses its activity, deterioration is easily caused to occur when a bottle of the juice product is uncorked after long time storage. When the compounds of the Formula I or II are used as preservative according to this invention at a concentration of 10–50γ/ml., the above-mentioned defects of the conventional preservatives can be overcome.

When the compounds of this invention are used as preservative for sake, it is desired that in the above-mentioned Formulae I and II the two hydroxyl groups are bonded to the benzene nucleus in the 2,4- or 3,4-positions and the alkyl group R has a chain length corresponding to 5–8 carbon atoms. Compounds of these structural characteristics are excellent in solubility and are stable with high antibacterial activity. Further, they are effective for controlling hiochic bacteria of a broad range and they do not give any bad influences to the taste and odor of sake when used as preservative for sake. Still further, they do not cause discoloration or turbidity in sake even after long period storage. As is specifically illustrated in Examples, these compounds are very effective at a very low concentration against typical hiochic bacteria and exhibit controlling effects against hiochic bacteria of a broad range found in brewhouses. Complete control of hiochic bacteria can be attained by using as preservative for sake, for instance, n-hexyl-2,4-dihydroxybenzoate at a concentration of 15–20 p.p.m. This proves that the compounds to be used in this invention are excellent over lysozyme which has attracted a great attention as new preservative, because lysozyme is not effective against hiochic bacteria of the *Lactobacillus acidophilus* type, though it hardly gives any bad influences to properties of sake and is deemed promising as preservative.

The embodiment of the process for the preservation of sake according to this invention is divided into the following three methods. The first method is mainly for attaining prevention of deterioration during tank-storage. Clear and transparent sake obtained by removing dregs from raw sake is heated at about 55° C. and is then stored in a tank. If this heat treatment is insufficient, various yeasts and hiochic bacteria are left in the sake and deterioration is caused by these microorganisms. In order to prevent occurrence of such deterioration, it is preferable to add the compound of the Formula I or II in an amount of 5–200 p.p.m., whereby growth of any microorganism is prevented for a time required for an ordinary tank-storage (1 year at the longest) and deterioration is not caused to occur during a long time storage after delivery from the storehouse but a fungicidal effect can be rather expected, resulting in effective preservation.

In accordance with the second method, sake in which the preservative compound of the Formula I or II has been incorporated by the above first method is treated with active carbon or other suitable adsorbent before its consignment to thereby remove substantially the preservative compound from the sake. In this method, if care is taken in the subsequent steps such as the bottling step, it is possible to make sake which is substantially free of any preservative and does not contain any hiochic bacterium at all.

The third method comprises adding a compound of the Formula I or II in the above-mentioned amount to sake which has been subjected to an active carbon treatment before consignment according to the above second method. This method is applied when there is a danger of hiochi putrefaction even after bottling. In case a bottle of sake is uncorked by a consumer, preservative-free sake undergoes hiochi putrefaction for a short time, particularly in summer. The third method is suitable for preventing occurrence of this hiochi putrefaction after the bottle opening.

When this invention is applied to the preservation of beer, it is desired that in the General Formula I or II the two hydroxyl groups are bonded to the benzene nucleus in the 2,4- or 3,4-positions and the alkyl group R has a length corresponding to 6–7 carbon atoms. By using these compounds non-pasteurized beer can be preserved without appearance of any turbidity at 0° C. which is inevitable in the case of heptyl para-hydroxybenzoate. Further, lowering of foam-retaining property of beer such as observed in the case of heptyl para-hydroxybenzoate can be greatly reduced by the use of the above-mentioned compounds.

Results of antibacterial tests of the compounds of the above-mentioned type against ordinary microorganisms conducted by using a potato dextrose medium (in the case of yeasts and mold fungi) or an agar medium (in the case of ordinary bacteria) are shown in Table 4. The numerical values in the table are values of the minimum growth inhibition concentration ($\gamma$/ml.) when the culturing is conducted for 4 days at 30° C.

TABLE 4

| Bacteria | Compound 17 | Compound 29 |
|---|---|---|
| Saccharomyces cerevisiae | 15.6 | <7.81 |
| Saccharomyces rouxii | <3.91 | <7.81 |
| Aspergillus niger | 62.5 | 62.5 |
| Staphylococcus aureus | 50 | 12 |
| Bacillus subtilis | 50 | 12 |
| Proteus vulgaris | 50 | 12 |

Main antibacterial activities of other compounds are shown in Table 5.

TABLE 5

| Compound No. | Yeast | Lactic acid bacilli |
|---|---|---|
| 16 | <7.81–62.5 | 250 |
| 11 | 3.91–31.25 | <25 |
| 28 | 7.81–15.63 | <50 |
| 34 | 3.91–15.63 | 25–50 |
| 4 | 7.81–125 | <5 |

Referring to innoxiousness and safety of these compounds, in oral administration tests using mice almost all of them exhibit $LD_{50}$ values of 3–6 grams, and therefore, they are characterized by very low toxicity.

When this invention is applied to the preservation of beer, sufficient effects are attainable regardless of the time of addition of the compounds of the Formula I or II throughout the beer-manufacturing process, but it is particularly preferable to make the addition just before the bottling step.

This invention is effectively applied also to the preservation of fruit wine such as grape wine.

In general, fruit wine such as grape wine undergoes film-formation by aerobic bacteria such as of the Mycoderma genus, acetic acid putrefaction by bacteria of the Acetobacter or Bacterium genus, and tartaric acid fermentation, mannit fermentation, bittering, fatting and lactic acid putrefaction by bacteria of the Bacterium genus during the manufacturing process or after the bottling treatment. These phenomena give bad influences to the product quality in many cases. Particularly in the case of white wine, use of a preservative is indispensable for control of the product quality. For this purpose it is recommended in the art to use sulfurous acid at a concentration of 450$\gamma$/ml. or salicyclic acid at a concentration of 250$\gamma$/ml., but these preservatives involve a problem of toxicity and their effects are not sufficient.

When this invention is applied to the preservative of fruit wine, the process of this invention can attain prominently excellent preservative effects over the conventional preservative process with use of sulfurous acid. Further, to our great surprise, this invention does not give any bad influences to the taste and odor of fruit wine at all.

The minimum growth inhibition concentration value ($\gamma$/ml.) of the compounds of this invention obtained in the culturing tests conducted on yeast and acetic acid bacterium at 30° C. for 20 days in wine to which 10% of water has been added, are shown in Table 6. From the results shown in Table 6 it can be seen that the compounds to be used in this invention are particularly effective against film-formation and acetic acid putrefaction,

TABLE 6

| Compound No. | Yeast | Acetic acid bacterium | Compound No. | Yeast | Acetic acid bacterium |
|---|---|---|---|---|---|
| 26 | 7.81 | 25 | 9 | 7.81 | 10 |
| 27 | 3.91 | 25 | 10 | 3.91 | 10 |
| 28 | 3.91 | 10 | 11 | 1.92 | 10 |
| 29 | 1.95 | 5 | 12 | 1.92 | 5 |
| 31 | 15.63 | 50 | 21 | 15.63 | 50 |
| 32 | 7.81 | 50 | 22 | 7.81 | 25 |
| 33 | 7.81 | 25 | 23 | 7.81 | 25 |
| 34 | 3.91 | 10 | 24 | 3.91 | 10 |
| 15 | 31.26 | 50 | 3 | 15.63 | 50 |
| 16 | 15.63 | 50 | 4 | 7.81 | 25 |
| 17 | 7.81 | 25 | 5 | 3.91 | 10 |
| 18 | 7.81 | 25 | 6 | 3.91 | 10 |

This invention will now be detailed by referring to examples.

EXAMPLE 1

Preservative-free raw soy was subjected to the pasteurizing treatment for 30 minutes at 60° C. or 80° C., followed by removal of drugs. Each of compounds indicated in Table 7 was added, respectively, to 20 ml. of the so-pasteurized soy sample. The test compound was added in the form of a solution in 1 N aqueous sodium hydroxide at concentrations varied in 10 scales from 3γ/ml. to 30γ/ml. A platinum loopful of trained film-forming yeast was infected to each sample and the sample was allowed to stand at 30° C. for 7 days and the growth of the yeast was examined. The results (minimum growth inhibition concentration—γ/ml.) are shown in Table 7. In Table 7 the symbol "+" means that turbidness was observed in the sample soy.

TABLE 7

| Preservative added | 60° C. pasteurization | | 80° C. pasteurization | |
|---|---|---|---|---|
| | 3 days | 7 days | 3 days | 7 days |
| Non-added control | + | + | + | + |
| Butyl parahydroxybenzoate | >30 | >30 | 27 | 30 |
| Compound: | | | | |
| 1 | | | 18 | 18 |
| 2 | | | 18 | 18 |
| 3 | | | 24 | 27 |
| 8 | | | 24 | 27 |
| 9 | | | 24 | 24 |
| 14 | | | 21 | 24 |

EXAMPLE 2

A solution of a test compound indicated in Table 8 in 1 N aqueous sodium hydroxide was added to about 100 ml. of vinegar free of a preservative and each sample was infected with one platinum loopful of a liquor containing trained saporgenous bacteria and allowed to stand at 30° C. for 20 days. Occurrence of turbidity and lowering in acidity caused by yeast and acetic acid bacterium were examined. Results are shown in Table 8. In Table 8 the acidity value is expressed in the term of the amount (ml.) of 0.1 N aqueous sodium hydroxide consumed for neutralizing 10 g. of the sample. The acidity of the vinegar used at the time of the addition of the test compound was 4.21. Symbols "−" to "++++" mean the absence of the turbidness and the intensity degree of the turbidness.

TABLE 8

| Preservative compound | Amount added (γ/ml.) | Turbidness | | Acidity | |
|---|---|---|---|---|---|
| | | 10 days | 20 days | 10 days | 20 days |
| Non-added control | | ++ | +++ | 3.44 | 3.02 |
| Butyl parahydroxybenzoate | 50 | − | + to ++ | 4.20 | 3.70 |
| Do | 140 | − | ± to + | 4.18 | 3.85 |
| Compound: | | | | | |
| 1 | 30 | − | ± to + | 4.22 | 4.06 |
| 2 | 30 | − | ± | 4.18 | 4.10 |
| 3 | 30 | − | ± | 4.19 | 4.12 |
| 4 | 30 | − | ± to + | 4.18 | 3.98 |

Similar tests were conducted with respect to other liquid condiments such as sauce and stock liquor, and it was confirmed that the compounds of this invention exhibited much higher anti-putrefaction and anti-deterioration effects at a concentration of 30γ/ml. than para-hydroxybenzoic acid esters at a concentration of 100–200γ/ml.

EXAMPLE 3

A bottle of a preservative-free carbonated drink maintained at 0° C. was uncorked and a solution of a test compound indicated in Table 9 in 1 N aqueous sodium hydroxide was added to the uncorked carbonate drink (about 200 ml.). Then the drink was infected with 1 ml. of a liquor containing trained yeast (the number of the yeast being about $10^5$ per gram), followed by corking of the bottle. Then the bottle was allowed to stand at 30° C. for 21 days, and the appearance of white turbidness was examined. Results are shown in Table 9. Symbols "−" to "++++" mean the absence of turbidness and the intensity degree of turbidness.

TABLE 9

| Preservative | Amount added (γ/ml.) | White turbidness | | |
|---|---|---|---|---|
| | | 7 days | 14 days | 21 days |
| Non-added control | | + | ++ | +++ |
| Benzoic acid | 600 | − | ± to + | + to ++ |
| Dehydroacetic acid | 50 | − | ± to + | + to ++ |
| Butyl parahydroxybenzoate | 70 | ± | + | ++ |
| Compound: | | | | |
| 8 | 30 | − | − | ± to + |
| 9 | 30 | − | − | ± to + |

From the results shown in Table 8 it can be seen that the compounds to be used in this invention are prominently effective for inhibiting the growth of yeast and preventing occurrence of white turbidness in carbonated drinks, as compared with the conventional preservatives such as benzoic acid, dehydroacetic acid, and para-hydroxybenzoic acid esters.

When similar tests were conducted with respect to non-carbonated drinks, it was confirmed that the compounds of this invention gave good preservative results.

EXAMPLE 4

One platinum loopful of a putrefactive liquor (containing trained yeast, mold, acid-resistant lactic acid bacteria and other bacteria) was added to 50 ml. of a fruit juice prepared by squeezing an orange (Onshyu variety) and adding sugar thereto in such an amount as would give a sugar content of 10%. Then a solution of a compound indicated in Table 10 in 1 N aqueous sodium hydroxide was added to the juice, and the juice was allowed to stand at 30° C. The growth of mold and occurrence of turbidness in the juice was examined. The results are shown in Table 10. Symbols "−" to "+++++" appearing in the table mean the absence of the mold or turbidness and the intensity degree of the mold growth or turbidness in the juice.

TABLE 10

| Preservative | Amount added (γ/ml.) | Turbidness | | | Mold growth | | |
|---|---|---|---|---|---|---|---|
| | | 3 days | 7 days | 10 days | 3 days | 7 days | 10 days |
| Non-added control | | + | ++ | +++ | + | +++ | +++++ |
| Benzoic acid | 500 | − | ± to + | ++ | − | − to + | + |
| Butyl parahydroxybenzoate | 30 | − | − | − to + | − | − | − |
| Compound: | | | | | | | |
| 2 | 30 | − | − to ± | ± to + | − | | ± |
| 3 | 30 | − | − to ± | ± to + | − | | − to ± |
| 9 | 30 | − | − | − | − | − | − |
| 15 | 30 | − | − | − | − | − | − |

EXAMPLE 5

Preservative-free raw soy was subjected to the pasteurizing treatment for 30 minutes at 60° C. or 80° C., followed by removal of dregs. Each of compounds indicated in Table 11 was added, respectively, to 20 ml. of the so pasteurized soy sample. The test compound was added in the form of a solution in 1 N aqueous sodium hydroxide at concentrations varied in 10 scales from $3\gamma/ml$. to $30\gamma/ml$. One platinum loopful of trained film-forming yeast was infected to each sample and the sample was allowed to stand at 30° C. for 7 days and the growth of the yeast was examined. The results (minimum growth inhibition concentration—$\gamma/ml$.) are shown in Table 11. Compound A is an ethyl ketone corresponding to Compound 25, compound B is a hexyl ketone corresponding to Compound 25, compound C is an ethyl ketone corresponding to Compound 30, and compound D is a hexyl ketone corresponding to Compound 30. The symbol "+" in the table means that the turbidness was caused to appear in the sample soy.

TABLE 11

| Preservative | 60° C. pasteurization | | 80° C. pasteurization | |
|---|---|---|---|---|
| | 3 days | 7 days | 3 days | 7 days |
| Non-added control | + | + | + | + |
| Butyl parahydroxybenzoate | >30 | >30 | 27 | 30 |
| Compound: | | | | |
| A | 18 | 21 | 18 | 21 |
| 25 | 12 | 15 | 15 | 15 |
| 26 | 12 | 15 | 12 | 15 |
| 27 | 12 | 12 | 12 | 15 |
| B | 24 | 24 | >30 | >30 |
| C | >30 | >30 | >30 | >30 |
| 32 | 12 | 15 | 12 | 15 |
| D | >30 | >30 | >30 | >30 |

EXAMPLE 6

A solution of a compound indicated in Table 12 in 1 N aqueous sodium hydroxide was added to about 100 ml. of preservative-free vinegar, and the sample vinegar was infected with one platinum loopful of a putrefactive liquor containing trained saprogenous bacteria and allowed to stand at 30° C. for 30 days. Turbidness and lowering in acidity caused by acetic acid bacteria and yeasts were examined. The results are shown in Table 12. In the table, the acidity value is expressed in the term of the amount (ml.) of 0.1 N aqueous sodium hydroxide consumed for neutralizing 10 g. of the sample. The acidity of the vinegar at the time of the addition of the test compound was 4.21. Symbols "−" to "+++" mean the absence of the turbidness and the intensity degree of the turbidness.

TABLE 12

| Preservative compound | Amount added ($\gamma$/ml.) | Turbidity | | Acidity | |
|---|---|---|---|---|---|
| | | 10 days | 20 days | 10 days | 20 days |
| Non-added control | | ++ | +++ | 3.44 | 3.02 |
| Butyl parahydroxybenzoate | 50 | − | + to ++ | 4.20 | 3.70 |
| Do | 140 | − | ± to + | 4.18 | 3.85 |
| Compound: | | | | | |
| 25 | 30 | − | ± to + | 4.19 | 4.01 |
| 26 | 30 | − | − | 4.18 | 4.17 |
| 27 | 30 | − | − | 4.20 | 4.19 |
| B | 30 | − | ± to + | 4.23 | 4.10 |
| 31 | 30 | − | ± | 4.19 | 4.12 |
| 32 | 30 | − | ± | 4.22 | 4.11 |
| 36 | 30 | − | ± | 4.19 | 4.08 |
| 37 | 30 | − | − to ± | 4.18 | 4.16 |

Similar tests were conducted with respect to other liquid condiments such as sauce and stock liquor, and it was confirmed that 2,4-dihydroxyphenyl alkyl ketones having a butyl or pentyl group as the alkyl group R in the Formula II exhibited much excellent effects for preventing putrefaction and deterioration at a concentration of $30\gamma/ml$. as compared with butyl para-hydroxybenzoate at a concentration of $100-200\gamma/ml$.

EXAMPLE 7

A bottle of a preservative-free carbonated drink maintained at 0° C. was uncorked and a solution of a test compound indicated in Table 13 in 1 N aqueous sodium hydroxide was added to the uncorked carbonated drink (about 200 ml.). The drink was infected with 1 ml. of a liquor containing trained yeast (the number of the yeast being about $10^5$ per gram), followed by corking of the bottle. Then the bottle was allowed to stand at 30° C. for 21 days, and the appearance of turbidness was examined. Results are shown in Table 13. Symbols "−" to "+++" mean the absence of turbidness and the intensity degree of turbidness.

TABLE 13

| Preservative | Amount added ($\gamma$/ml.) | White turbidness | | |
|---|---|---|---|---|
| | | 7 days | 14 days | 21 days |
| Non-added control | | + | ++ | +++ |
| Benzoic acid | 600 | − | ± to + | + to ++ |
| Dehydroacetic acid | 50 | − | ± to + | + to ++ |
| Butyl para-hydroxybenzoate | 70 | ± | + | ++ |
| Para-hydroxyphenyl butyl ketone | 30 | − | ± | + |
| Compound: | | | | |
| 26 | 30 | − | − | ± |
| 27 | 30 | − | − | ± |

From the results shown in Table 13 it can be seen that the compounds to be used in this invention are prominently effective for inhibiting the growth of yeast and preventing occurrence of turbidness in carbonated drinks, as compared with the conventional preservatives such as benzoic acid, dehydroacetic acid and para-hydroxybenzoic acid esters.

When similar tests were conducted with respect to non-carbonated drinks, it was confirmed that the compounds of this invention gave good preservative results.

EXAMPLE 8

One platinum loopful of a putrefactive liquor (containing trained yeast, mold, acid-resistant lactic acid bacteria and other bacteria) was added to 50 ml. of a fruit juice prepared by squeezing an orange (Onshyu variety) and adding sugar thereto in such an amount as would give a sugar content of 10%. Then, a solution of a compound indicated in Table 14 in 1 N aqueous sodium hydroxide was added to the juice, and the juice was allowed to stand at 30° C. The growth of mold and occurrence of turbidness were examined. Results are shown in Table 14. Symbols "−" to "+++++" appearing in the table mean the absence of the mold growth or turbidness and the intensity degree of the mold growth or turbidness in the juice sample.

TABLE 14

| Preservative | Amount added ($\gamma$/ml.) | Turbidity | | | Mold growth | | |
|---|---|---|---|---|---|---|---|
| | | 3 days | 7 days | 10 days | 3 days | 7 days | 10 days |
| Non-added control | | + | ++ | +++ | + | +++ | +++++ |
| Benzoic acid | 500 | − | ± to + | ++ | − | − to ± | + |
| Butyl parahydroxybenzoate | 30 | − | − | − to ± | − | − | − |
| Compound: | | | | | | | |
| 26 | 30 | − | − | ± | − | − | − to ± |
| 27 | 30 | − | − | ± | − | − | − to ± |
| 37 | 150 | − | − | ± | − | − | − |

From the results shown in Table 14 it can be seen that the compounds to be used in this invention are prominently effective for inhibiting the growth of mold and preventing the occurrence of turbidness in fruit juice, as compared with benzoic acid.

EXAMPLE 9

An alcoholic solution of a compound indicated in Table 15 was added in a lever piece-sake-peptone medium. The content of the compound in the alcoholic solution was less than 1%. Water was added to the medium to adjust the alcohol concentration to 13%. Each of the following 4 bacteria used frequently in tests as standard hiochic bacteria was added separately in an amount of $10^5$ cells per ml. to the medium. The medium was allowed to stand at 30° C. and after 20 days' culturing the minimum growth inhibition concentration ($\gamma$/ml.) was determined. For comparison, tests were conducted similarly with use of salicylic acid and lysozyme. Results are shown in Table 15.

Hiochic bacteria used

Lactobacillus homohiochi _____ (H 42)
Lactobacillus heterohiochi _____ (H 1)
Lactobacillus fermentum _____ (H 34)
Lactobacillus acidophilus _____ (H 7)

TABLE 15

| Preservative | Minimum growth inhibition concentration ($\gamma$/ml.) | | | |
|---|---|---|---|---|
| | Lactobacillus homohiochi | Lactobacillus heterochiochi | Lactobacillus fermentum | Lactobacillus acidophilus |
| Salicylic acid | 400 | 200 | 200 | 400 |
| Lysozyme | 20 | 10 | <1 | >100 |
| Compound: | | | | |
| 26 | 100 | 75 | 100 | 100 |
| 27 | 50 | 50 | 50 | 50 |
| 28 | 25 | 10 | 25 | 25 |
| 29 | 10 | 10 | 10 | 10 |
| 31 | 100 | 100 | 100 | 100 |
| 32 | 50 | 50 | 50 | 50 |
| 33 | 25 | 10 | 25 | 25 |
| 34 | 10 | 10 | 10 | 10 |
| 38 | 100 | 100 | 50 | 50 |

EXAMPLE 10

A preservative-free sake of an alcohol concentration of 16.0% was infected with $2\times10^5$ cells/ml. of hiochic lactobacilli collected at a brewery located at Nada, Kobe, Japan. To the so infected sake was added a solution of a compound indicated in Table 16 in alcohol, the concentration of which is also indicated in Table 16. The increase of the alcohol content in the sample sake by addition of the alcoholic solution of the preservative compound was adjusted to the original concentration by addition of water, and then the sample sake was packed in a blue glass bottle, followed by corking of the bottle. For comparison, similar tests were conducted with use of lysozyme at 40$\gamma$/ml. as well as salicylic acid.

The bottle was then allowed to stand at 30° C. and occurrence of turbidness caused by hiochi bacteria was examined. Resuts are shown in Table 16. In Table 16, the symbol "+" means that hiochi putrefaction was caused to occur and the symbol "—" means that hiochi putrefaction was not caused to occur. Also in the table, "white turbidness" means that white turbidness was caused to occur by precipitation of crystals when the sample was maintained at 0° C. for 48 hours. From the results shown in Table 16, it can be seen that the compounds to be used in this invention can exhibit excellent activity for preventing the growth of hiochic bacteria at low concentrations and are far more effective than salicylic acid used at a concentration of 500 p.p.m. which is two times as high as the allowed upper limit of the salicylic acid concentration.

TABLE 16

| Preservative | Amount added ($\gamma$/ml.) | Storage period | | | | Stored at 0° C. for 48 hours |
|---|---|---|---|---|---|---|
| | | 7 days | 14 days | 21 days | 70 days | |
| Non-added control | | + | + | + | + | |
| Salicylic acid | 500 | — | — | — | + | |
| | 250 | — | + | + | + | |
| Lysozyme | 40 | + | + | + | + | White turbidness. |
| Compound 28 | 50 | — | — | — | — | |
| | 25 | — | — | — | — | |
| | 10 | — | — | — | + | |
| Compound 34 | 25 | — | — | — | — | Do. |
| | 10 | — | — | — | — | |
| | 5 | — | — | — | + | |

When sake samples incorporated with the compounds of this invention at concentrations above the effective concentration, namely samples incorporated with compound 28 at 50$\gamma$/ml. or compound 34 at 25$\gamma$/ml., were subjected to the sensory test before infection with hiochic bacteria, it was found that the addition of these compounds did not give any influence to taste or odor of sake. Samples incorporated with these compounds above the effective concentration did not show any changes in the exterior appearance such as change in color even after 70 days' storage.

EXAMPLE 11

A commercially available preservative-free sake was incorporated with 10% of Koji prepared separately, and the agitation was conducted at 30° C. for 4 hours, followed by filtration. Alcohol was added to the filtrate to adjust the alcohol concentration to 20 degrees. Then active carbon was added to the medium in an amount of 200 p.p.m., and the medium was filtered and maintained at 56° C. for 20 minutes in a water bath equipped with a reflux cooler. Then the medium was tainted with $1.2\times10^2$ cells per ml. of hiochic bacteria collected at a brewery located at Nada, Kobe, Japan, and an alcohol solution of compound 28 or 34 was added to the tainted sample. The final concentration of the additive compound was adjusted to 25 p.p.m. or 10 p.p.m. For comparison, salicylic acid was added at concentrations of 250 p.p.m. and 500 p.p.m. The increased alcohol content by the addition of the preservative solution was reduced to 20 degrees by addition of water. Each sample was taken into a 200-ml. beaker and sealed with polyethylene film. In this state, the sample was maintained at 30° C. and the condition of the sample was examined. Results are shown in Table 17.

TABLE 17

| Preservative | Amount added ($\gamma$/ml.) | Storage period | | | |
|---|---|---|---|---|---|
| | | 7 days | 14 days | 21 days | 70 days |
| Non-added control | | + | + | + | + |
| Salicylic acid | 250 | — | + | + | + |
| | 500 | — | — | — | — |
| Compound: | | | | | |
| 28 | 25 | — | — | — | — |
| 34 | 10 | — | — | — | — |

In Table 17, the symbol "—" means that hiochi putrefaction was not observed and the symbol "+" means that hiochi putrefaction was observed.

In the above test conducted with hiochi putrefaction in a barrel being taken into consideration, the sample incorporated with salicylic acid at 250$\gamma$/ml. underwent hiochi putrefaction.

After 70 days' storage, each sample of sake was admixed with 400 p.p.m. of active carbon and filtered. Then the filtrate was diluted with pasteurized water so that the alcohol concentration would be 16%. Then the sample was carefully charged into a pasteurized bottle, and the bottle was corked and stored at 30° C. Results are shown in Table 18 in which the symbol "—" means that hiochi putrefaction was not observed and the symbol "+" means that hiochi putrefaction was observed.

TABLE 18

| Preservative | Amount added (γ/ml.) | Storage period | | | |
|---|---|---|---|---|---|
| | | 7 days | 14 days | 21 days | 70 days |
| Salicylic acid | 500 | — | — | + | + |
| Compound: | | | | | |
| 28 | 25 | — | — | — | — |
| 34 | 10 | — | — | — | — |

The amount of the preservative remaining in the sample was determined by the ultra-violet absorption analysis. Results are shown in Table 19. In the sample after the active carbon treatment, the lowering of the alcohol content caused by water tempering was regulated before the determination.

TABLE 19

| | Remaining preservative ratio, percent | | |
|---|---|---|---|
| Preservative | Just after addition | After 70 days' storage | After active carbon treatment |
| Salicylic acid (500γ/ml.) | 100 | 100 | 70 |
| Compound 28 (25γ/ml.) | 100 | 100 | <1 |
| Compound 34 (10γ/ml.) | 100 | 100 | <1 |

EXAMPLE 12

20 liters of mirin (sweet sake) containing 17% of alcohol, 0.01% of acids (reckoned as lactic acid) and 41.2% of sugar was divided into 4 portions, each being 5 liters. To two portions, Compounds 28 and 34 were added, at 25γ/ml. and 10γ/ml., respectively. For comparison, salicylic acid was added to another portion at 250γ/ml. Each compound was added in the form of an alcoholic solution. The increase of the alcohol content was regulated by addition of water. Each portion was poured into 25 of 200-ml. bottles, and a platinum loopful of trained *Lactobacillus acidophilus* was infected to each bottle, followed by corking of the bottle. Each bottle was stored at 30° C. and the condition of the sample was examined. Any change was not observed for 3 months with respect to each of samples incorporated with compounds 28 and 34 to be used in this invention, but all the samples incorporated with salicylic acid were putrefied within 30 days.

EXAMPLE 13

Tests were conducted in a lever piece-sake-peptone culture medium for 20 days in the same manner as in Example 9 by using dihydroxybenzoic acid esters indicated in Table 20. Results (minimum growth inhibition concentration—γ/ml.) are shown in Table 20.

TABLE 20

| | Minimum growth inhibition concentration (γ/ml.) | | | |
|---|---|---|---|---|
| Preservative | Latcobacillus homohiochi | Lactobacillus heterohiochi | Lactobacillus fermentum | Lactobacillus acidophilus |
| Salicylic acid | 400 | 200 | 200 | 400 |
| Lysozyme | 20 | 10 | <1 | >100 |
| Compound: | | | | |
| 15 | 200 | 150 | 200 | 200 |
| 16 | 100 | 75 | 100 | 100 |
| 17 | 30 | 20 | 30 | 30 |
| 18 | 10 | 10 | 10 | 10 |
| 9 | 300 | 250 | 250 | 250 |
| 10 | 150 | 100 | 100 | 150 |
| 11 | 25 | 25 | 25 | 25 |
| 12 | 10 | 10 | 10 | 10 |
| 21 | 400 | 200 | 200 | 400 |
| 22 | 300 | 100 | 300 | 100 |
| 23 | 200 | 50 | 50 | 200 |
| 24 | 50 | 30 | 30 | 50 |
| 3 | 60 | 45 | 45 | 50 |
| 4 | 20 | 15 | 15 | 18 |
| 5 | 8 | 5 | 5 | <5 |
| 6 | <5 | <5 | <5 | <5 |

EXAMPLE 14

A preservative-free sake of an alcohol content of 16.0% was tainted with 2×10³ cells per ml. of hiochic bacteria, and then was charged in a 300-ml. blue glass bottle. To the bottle was added a compound indicated in Table 21 in an amount also indicated in the table. For comparison, salicylic acid was also tested. Bottles were corked and stored at 30° C. Occurrence of turbidity caused by hiochi bacteria was examined. Results are shown in Table 21 in which the symbol "—" means that turbidity was not observed and the symbol "+" means that turbidity was observed. Each preservative was added in the form of an alcoholic solution, and the increase of the alcohol content by the addition of the preservative was regulated to the original content of 16% by addition of water.

TABLE 21

| Preservative | Amount added (γ/ml.) | Storage period | | | | Stored at 0° C. for 48 hours |
|---|---|---|---|---|---|---|
| | | 7 days | 14 days | 21 days | 70 days | |
| Non-added control. | | + | + | + | + | |
| Salicylic acid | 500 | — | — | + | + | |
| | 250 | + | + | + | + | |
| Compound 17 | 50 | — | — | — | — | White turbidness. |
| | 30 | — | — | — | — | |
| | 20 | — | — | + | + | |
| Compound 11 | 50 | — | — | — | — | Do. |
| | 25 | — | — | — | — | |
| | 10 | — | — | + | + | |
| Compound 4 | 20 | — | — | — | — | |
| | 10 | — | — | — | — | |
| | 5 | — | — | — | + | |

When samples incorporated with the above compounds to be used in this invention at concentrations exceeding the effective concentration were subjected to the sensory test, it was confirmed that these compounds did not give any bad influences to the taste and odor of sake at all. In each of samples incorporated with the compounds to be used in this invention there was not observed any change in color even after 70 days' storage.

EXAMPLE 15

20 liters of mirin (sweet sake) containing 17.0% of alcohol, 0.01% of acids (reckoned as lactic acid) and 41.2% of sugar was divided into 4 portions, each portion being 5 liters. Compounds 17, 11 and 5 in the alcohol solution form were added at 30γ/ml., 25γ/ml. and 50γ/ml., respectively, to three portions. The remaining one portion was tested as preservative-free control. Each compound was added in the form of an ethanol solution and the increase of the alcohol content by the addition of the preservative was regulated by addition of water to the original content of 17%. Each portion was poured into 25 of 200-ml. bottles, and a platinum loopful of trained *Lactobacillus acidophilus* was infected to each bottle. Then each bottle was stored at 30° C. and the condition of the sample was examined. Any change was observed for 3 months with respect to each of samples incorporated with compounds to be used in this invention, but all the samples of the control portion were putrefied within 10–20 days.

EXAMPLE 16

*Saccharomyces cerevisiae*, *Saccharomyces ubarum*, and *Lactobacillus pastorianus*, which are considered to be beer-putrefying bacteria, were trained separately in a 3% malt extract broth containing 4% ethanol. By employing these broths antibacterial activities of Compounds 17, 29, 16 and 28 were tested. One drop of the broth liquor in which 3 strains had been trained for 72 hours was added by an injector to a medium containing the preservative compound and the incubation was carried out at 30° C. for 7 days and the growth of the sample bacterium was examined. With respect to each compound, the minimum growth inhibition concentration (γ/ml.) was determined.

For comparison, n-heptyl para-hydroxybenzoate (POBH) was tested in a similar manner. Results are shown in Table 22.

TABLE 22

| Preservative | Minimum growth inhibition concentration (γ/ml.) | | |
|---|---|---|---|
| | Saccharomyces cerevisiae | Saccharomyces ubarum | Lactobacillus pastorianus |
| Compound: | | | |
| 17 | 9 | 9 | 9 |
| 29 | 4 | 6 | 4 |
| 16 | 12 | 12 | 10 |
| 28 | 8 | 8 | 8 |
| POBH | 8 | 8 | 6 |

EXAMPLE 17

Beer-perservative effects of Compounds 17 and 29 were examined. 1 ml. of a solution of Compound 17 or 29 in ethanol was added to 349 ml. of non-pasterized beer and stored at room temperature in the bottled state. Beer incorporated with POBH in a similar manner and beer pasteurized by heating were also tested as comparisons. After the storage at room temperature, a part of the sample beer was maintained at 0° C. for 2 weeks and the solubility and stability of the preservative compound at 0° C. was examined. Results are shown in Table 23 in which column "storage" shows the results of the storage test at room temperature and column "stability" shows the results of the stability test at 0° C. In the table, the numerical value indicates the number of months during which the sample was stored without any putrefaction and the symbol "+" means that occurrence of white turbidness or precipitation of crystals was observed.

TABLE 23

| Concentration (γ/ml.) | Compound 17 | | Compound 29 | | POBH | |
|---|---|---|---|---|---|---|
| | Storage | Stability | Storage | Stability | Storage | Stability |
| Non-treated control | (1) | | | | | |
| 8 | 4 | — | 6 | — | 4 | ± |
| 10 | >6 | — | >6 | ± | >6 | + |
| 12 | >6 | — | >6 | + | >6 | + |
| 14 | >6 | — | | | | |

It was found that in samples incorporated with Compounds 17 and 29 at 10γ/ml. or above there were attained prominent preservative effects similar to the comparison pasteurized by heating. With respect to the stability at 0° C., in either Compound 17 or 29 occurrence of white turbidness or precipitation of crystals was not observed at 8γ/ml., while in POBH occurrence of white turbidness was observed at 8γ/ml. In the case of Compound 17, any turbidness was not observed even at 14γ/ml. and hence, it can be seen that Compound 17 is particularly excellent in solubility and stability.

EXAMPLE 18

In this example influences of Compounds 17 and 29 on the taste of beer were examined. Sample A was prepared by adding to non-pasteurized beer an ethanol solution of Compound 17 or 29 (the ethanol content being about 0.3% based on beer) to form a beer solution containing the compound at 10γ/ml. Sample B was prepared by adding to non-pasteurized beer ethanol of the same as above (the ethanol content being about 0.3%). Sample C was prepared by adding ethanol of the same amount as above to heat-pasteurized beer.

A panel of 10 experts were selected for the sensory test, and pair-tests of samples A and B and of samples A and C were repeated twice, respectively. The temperature of beer at the time of drinking was maintained at 6–9° C. Results of the tests are shown in Table 24, in which the mark "*" indicates 5% significant difference.

TABLE 24

| | Compound 17 | | | Compound 29 | | |
|---|---|---|---|---|---|---|
| | Number of testers evaluated A more highly than B or C | Number of testers evaluated B more highly than A | Number of testers evaluated C more highly than A | Number of testers evaluated A more highly than B or C | Number of testers evaluated B more highly than A | Number of testers evaluated C more highly than A |
| Comparison of samples A and B | 9 | 11 | | 10 | 10 | |
| Comparison of samples A and C | *15 | | 5 | *16 | | 4 |

From the results shown in Table 24, it can be seen that samples incorporated with Compounds 17 and 29 did not undergo any taste deterioration as compared with non-pasteurized beer and were evaluated more highly by 5% significancy difference than beer pasteurized by heating.

EXAMPLE 19

An ethanol solution of a preservative indicated in Table 25 was added to a preservative-free red wine, and the wine was infected with one platinum loopful each of film-forming yeast and acetic acid bacterium and stored at 30° C. for 70 days. Then change in quality was examined. In each sample, any deterioration was not detected at the sensory test conducted just after the addition of the preservative. Further, any change in color was not observed after 70 days' storage with respect to each sample. The results of the preservative tests are shown in Table 25, in which the symbol "+" means that white turbidness was caused to occur by the growth of microorganisms.

TABLE 25

| Preservative | Amount added (γ/ml.) | Storage period | | | |
|---|---|---|---|---|---|
| | | 7 days | 14 days | 21 days | 70 days |
| Salicylic acid | 250 | — | — | + | + |
| SO₂ | 400 | — | — | + | + |
| Compound: | | | | | |
| 28 | 25 | — | — | — | — |
| 17 | 30 | — | — | — | — |
| 6 | 5 | — | — | — | — |

EXAMPLE 20

An ethanol solution of a preservative compound indicated in Table 26 was added to a preservative-free white wine, and the wine was infected with trained film-forming yeast and acetic acid bacterium (the contamination degree of each bacterium being 2×10² cells per ml.), and then stored at 30° C. for 70 days in the bottled state. Then change in quality was examined. In each sample, any deterioration was not detected at the sense test conducted just after addition of the preservative. Further, any change in color was not observed after 70 days' storage with respect to each sample. The results of the preservative tests are shown in Table 26, in which the symbol "+" means that white turbidness was caused to occur by the growth of microorganisms.

TABLE 26

| Preservative | Amount added (γ/ml.) | Storage period | | | |
|---|---|---|---|---|---|
| | | 7 days | 14 days | 21 days | 70 days |
| Salicylic acid | 250 | − | − | + | + |
| SO₂ | 400 | − | − | + | + |
| Compound: | | | | | |
| 28 | 25 | − | − | − | − |
| 17 | 30 | − | − | − | − |
| 6 | 5 | − | − | − | − |
| Non-added control | | + | + | + | + |

What we claim is:

1. In a process for the preservation of alcoholic beverages selected from beer, sake and fruit wines, the improvement which comprises adding to said alcoholic beverage in an amount of 5–300 p.p.m. a compound expressed by the formula

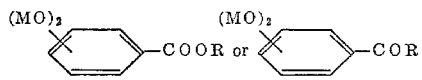

wherein R is an alkyl group of 5–8 carbon atoms, M is selected from the group consisting of hydrogen, an alkali metal and ½ mole of an alkaline earth metal, and the two MO groups are bonded to the benzene nucleus in the 2,4- or 3,4-positions to the group COOR or COR.

2. The process of claim 1 wherein the compound is added in an amount of 5–60 p.p.m.

3. The process of claim 1 wherein the compound is added in the form of a solution in an esculently harmless solvent.

4. The process of claim 1 wherein the alcoholic beverage is sake.

5. The process of claim 1 wherein the alcoholic beverage is beer and R is an alkyl group of 6–7 carbon atoms.

References Cited

UNITED STATES PATENTS

| 3,232,766 | 2/1966 | Strandskov et al. | 99—48 |
| 3,175,912 | 3/1965 | Strandskov et al. | 99—224 |
| 3,490,913 | 1/1970 | Lonein | 99—48 |

OTHER REFERENCES

Sabalitschka et al., Chemical Abstracts, vol. 26, 1932, p. 3617, "Relation Between Chemical Constitution and Antimicrobic Action."

NORMAN YUDKOFF, Primary Examiner

C. P. RIBANDO, Assistant Examiner

U.S. Cl. X.R.

426—365